(12) United States Patent
Miyakawa et al.

(10) Patent No.: US 6,218,623 B1
(45) Date of Patent: Apr. 17, 2001

(54) PROTECTIVE TUBULAR MEMBER FOR AUTOMOTIVE CONTROL WIRE AND MANUFACTURING METHOD THEREFOR

(75) Inventors: Naohisa Miyakawa, Inba-gun; Katsuhisa Kato, Moriya-machi, both of (JP)

(73) Assignees: Tokiwa Chemical Industries Co., Ltd., Chiba (JP); System Technical Co., Ltd., Ibaragi (JP)

( * ) Notice: Subject to any disclaimer, the term of this patent is extended or adjusted under 35 U.S.C. 154(b) by 0 days.

(21) Appl. No.: 09/256,104

(22) Filed: Feb. 24, 1999

(30) Foreign Application Priority Data

Feb. 26, 1998 (JP) .................................................. 10-089163
Aug. 27, 1998 (JP) .................................................. 10-281898

(51) Int. Cl.[7] ...................................................... H01B 7/28
(52) U.S. Cl. ........................................................ 174/120 R
(58) Field of Search ........................... 174/120 R, 120 C, 174/120 SR, 121 SR, 118, 110 F; 138/137, 141, 146, DIG. 6, DIG. 7; 428/35.9, 36.9, 36.91, 194

(56) References Cited

U.S. PATENT DOCUMENTS

| | | | |
|---|---|---|---|
| 2,454,800 | * 11/1948 | Hartstein et al. ...................... | 174/28 |
| 2,645,249 | * 7/1953 | Davis et al. ........................... | 138/137 |
| 3,349,169 | * 10/1967 | Donadieu ............................. | 174/128.1 |
| 3,852,518 | * 12/1974 | Wargotz et al. ...................... | 174/120 SR |
| 3,950,604 | * 4/1976 | Penneck ............................... | 174/DIG. 8 X |
| 3,968,463 | * 7/1976 | Boysen ................................. | 174/100 F X |
| 5,958,532 | * 9/1999 | Krause et al. ........................ | 428/36.3 |

* cited by examiner

Primary Examiner—Kristine Kincaid
Assistant Examiner—Chau N. Nguyen
(74) Attorney, Agent, or Firm—Wenderoth, Lind & Ponack, L.L.P.

(57) ABSTRACT

A protective tubular member for an automotive control wire includes a hollow tubular member made of a synthetic resin and a protective film layer joined integrally to the hollow tubular member. The protective film layer is provided with a rough surface portion having irregularities on the exposed surface of the protective film layer. A manufacturing method for the protective tubular member includes the steps of pouring and melting a mixture for the protective film layer, formed of a base material and an additive material, in a first extrusion molding machine, pouring and melting a synthetic resin for the hollow tubular member in a second extrusion molding machine, operating the first and second extrusion molding machines at the same time, polymerizing and jointing integrally the mixed resin in the first extrusion molding machine and the synthetic resin in the second extrusion molding machine in a die by heat and pressure, and forming a rough surface portion with irregularities on the exposed surface of the protective film layer due to the grains and particles of the additive material.

4 Claims, 4 Drawing Sheets

PROTECTIVE TUBULAR MEMBER FOR AUTOMOTIVE CONTROL WIRE AND MANUFACTURING METHOD THEREFOR

BACKGROUND OF THE INVENTION

1. Field of the Invention

The present invention relates to a protective tubular member for an automotive control wire which is provided for various mechanisms of an automobile such as trunk opening mechanism, bonnet opening mechanism, fuel lid opening mechanism, throttle, choke, brake, transmission, and window regulator and transmits the operation by pulling, and to a method for manufacturing the protective tubular member.

2. Description of Related Art

A publicly known protective tubular member for an automotive control wire is constructed so that a control wire 22 is covered with a hollow tubular member 21 formed of a synthetic resin, as shown in FIG. 7, to protect the operation of a control wire provided for various mechanisms of an automobile for a long period of time. The publicly known protective tubular member 20 consisting of the hollow tubular member 21 made of a synthetic resin has a disadvantage because the control wire 22 in the tubular member 21 is operated heavily by powerful push and pull forces, the hollow tubular member 21 wears remarkably and is damaged. Thus, which the protective tubular member 20 becomes unusable as the protective member of the control wire. Further, in order to prevent damage to the protective tubular member, a protective tubular member 20 for the automotive control wire 22 as shown in FIG. 8 has been developed. The hollow tubular member 21 is made of a synthetic resin covering the control wire is covered with an external tubular member 23 made of a synthetic resin, which is provided with steel wires 24 on the inside surface thereof. However, this protective tubular member 20 has problems in that the manufacture thereof requires much manpower and cost. Also, the friction between the steel wires at the inner periphery of the external tubular member 23 and the outer periphery of the hollow tubular member 21 results in damage to the hollow tubular member.

SUMMARY OF THE INVENTION

An object of the present invention is to provide a protective tubular member for an automotive control wire and a method for manufacturing the protective tubular member in which a rough surface portion with irregularities is formed on the exposed surface of an internal protective film layer in contact with the control wire to prevent damage by reducing wear caused by contact with the control wire.

The protective tubular member for an automotive control wire in accordance with the present invention comprises a hollow tubular member formed of a synthetic resin and a protective film layer joined integrally to the hollow tubular member. The protective film layer is formed of a base material that is compatible with the synthetic resin for the hollow tubular member and has a low frictional resistance, and an additive material of grains and particles of synthetic resin having a higher melting point and a lower frictional resistance than the base material. The additive material is mixed with the base material to form a rough surface portion with irregularities on the exposed surface of the protective film layer.

In the protective tubular member for an automotive control wire in accordance with the present invention, the protective film layer can be formed of a base material of polyolefin based resin with a low frictional resistance having low viscosity and high fluidity and an additive material of powder and particles of polyolefin based resin having a higher viscosity and lower fluidity than the base material.

In the method of manufacturing a protective tubular member for an automotive control wire in accordance with the present invention, a mixture for a protective film layer consisting of a base material of a synthetic resin having compatibility with and a lower frictional resistance than a synthetic resin for a hollow tubular member and an additive material of grains and particles of synthetic resin, inorganic material, or mineral having a higher melting point and a lower frictional resistance than the base material is poured and melted in a first extrusion molding machine. A synthetic resin for the hollow tubular member is poured and melted in a second extrusion molding machine, and the first and second extrusion molding machines are operated at the same time. The mixture in the first extrusion molding machine and the synthetic resin in the second extrusion molding machine are polymerized and joined integrally in a die by heat and pressure to form the hollow tubular member provided with the protective film layer having a rough surface portion with irregularities.

In the method of manufacturing a protective tubular member for an automotive control wire in accordance with the present invention, a mixture for the protective film layer consisting of a base material of polyolefin resin with a low frictional resistance having low viscosity and high fluidity and an additive material of powder and particles of polyolefin resin having higher viscosity and lower fluidity than the base material can be poured in the first extrusion molding machine.

DETAILED DESCRIPTION OF THE PREFERRED EMBODIMENTS

Figure 1:
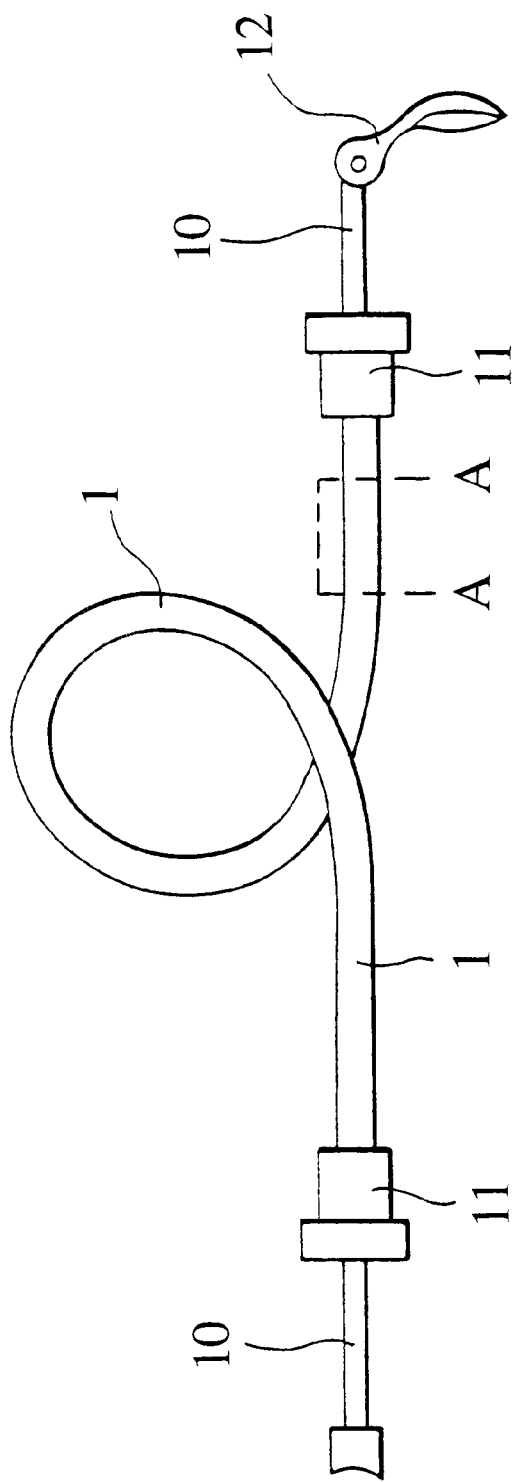
FIG. 1 is a front view showing a state in which a protective tubular member in accordance with the present invention is used in an automotive control wire.

As shown in FIG. 1, a protective tubular member 1 in accordance with the present invention is provided at both ends with a terminal member 11, and protectively covers a control wire 10, one end of which is fitted to one of various mechanisms of an automobile such as a trunk opener, a bonnet opener, a fuel lid opener, a throttle, a choke, a brake, a transmission, and a window regulator, and the other end of which is connected with a control lever 12, thereby transmitting the operation of each mechanism of the automobile by pulling the control lever 12.

Figure 2:
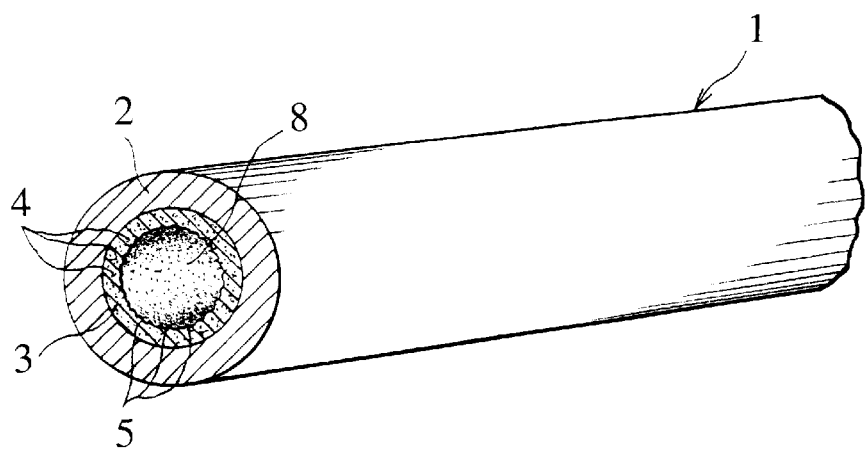
FIG. 2 is a perspective view of a protective tubular member in accordance with the present invention.
Figure 3:
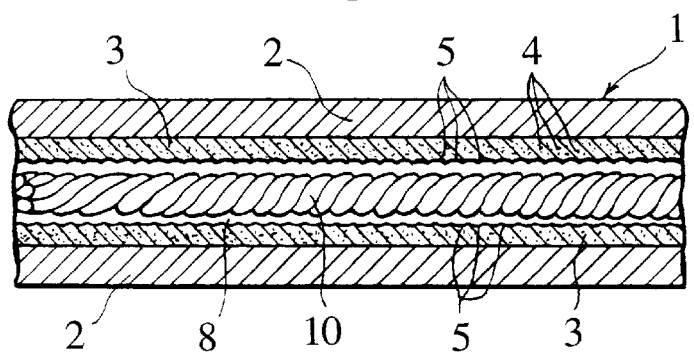
FIG. 3 is a longitudinal sectional view taken along the line A—A of FIG. 1.
Figure 4:
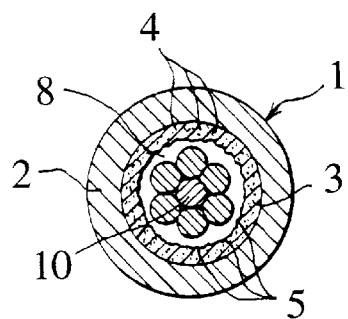
FIG. 4 is a transverse sectional view of a protective tubular member in accordance with the present invention.

As shown in FIGS. 2 to 4, the protective tubular member 1 is provided with an internal protective film layer 3 formed integrally with a hollow tubular member 2 on the inner peripheral surface of the hollow tubular member 2 which is made of a synthetic resin. The internal protective film layer 3 is formed of a mixed synthetic resin in which a synthetic resin having compatibility with and a lower frictional resistance than the synthetic resin of the hollow tubular member 2 is used as a base material and an additive material 4 is mixed with the base material. The additive material consists of grains and particles of synthetic resin, which has a higher melting point and lower frictional resistance than those of the base material. Due to the additive material 4, the internal protective film layer 3 is provided with a rough surface portion 5, which has a large number of irregularities on the exposed inner peripheral surface thereof.

A control wire 10 is inserted in a through hole 8 formed in the internal protective film layer 3 on as shown in FIGS. 3 and 4, and is provided in the inside of the internal protective film layer 3 so as to be in contact with the rough surface portion 5.

Figure 5:
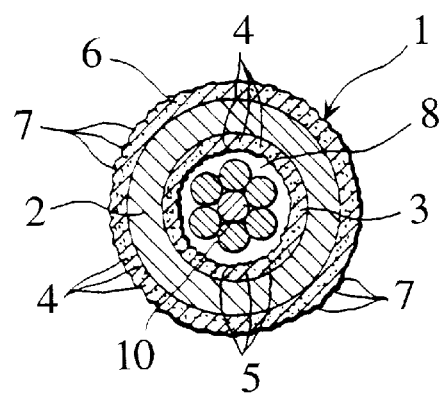
FIG. 5 is a transverse sectional view of a modification of the protective tubular member in accordance with the present invention.

As shown in FIG. 5, the protective tubular member 1 has not only the internal protective film layer 3 on the inner peripheral surface of the hollow tubular member 2 but also an external protective film layer 6 formed integrally with the hollow tubular member 2 on the outer peripheral surface of the hollow tubular member 2. The external protective film layer 6 is also formed of a mixed synthetic resin in which a synthetic resin that is compatible with the synthetic resin of the hollow tubular member 2 and a low frictional resistance is used as a base material and an additive material 4 is mixed with the base material. The additive material includes grains and particles of synthetic resin, which has a higher melting point and lower frictional resistance than those of the base material. Due to the additive material 4, the external protective film layer 6 is also provided with a rough surface portion 7 having a large number of irregularities on the exposed outer peripheral surface thereof.

Figure 6:
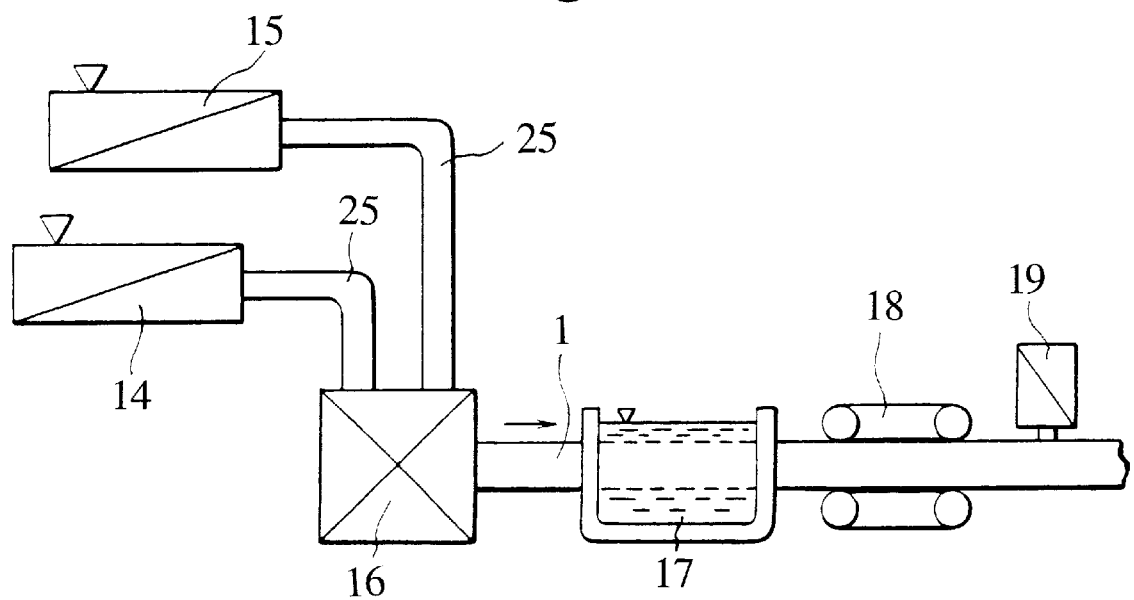
FIG. 6 is a front view showing a manufacturing process for a protective tubular member in accordance with the present invention.
Figure 7:
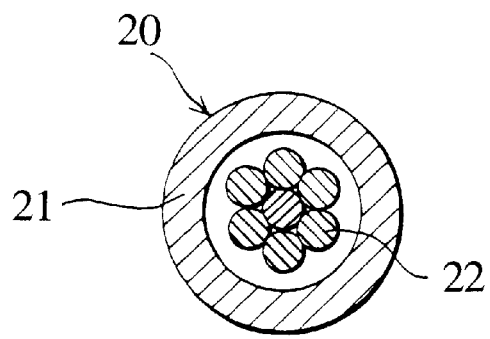
FIG. 7 is a transverse sectional view of a prior art protective tubular member.
Figure 8:
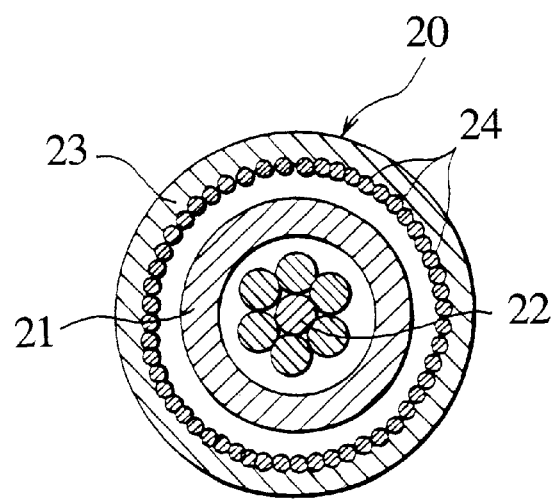
FIG. 8 is a transverse sectional view of another prior art protective tubular member.

FIG. 6 shows a manufacturing process for the protective tubular member 1 in accordance with the present invention. In FIG. 6, a first extrusion molding machine 14 contains, as a component for forming the protective film layer 3, the mixed synthetic resin formed of the base material of synthetic resin that is compatible with an olefin based synthetic resin of the hollow tubular member 2 and has a low frictional resistance, and the additive material 4 consisting of grains and particles of synthetic resin, which has a higher melting point and lower frictional resistance than those of the base material. A second extrusion molding machine 15 contains the olefin based synthetic resin for forming the hollow tubular member 2. The first and second extrusion molding machines 14 and 15 are operated at the same time. Specifically, the mixed synthetic resin is poured from the first extrusion molding machine 14 into a die 16 through a flow pipe 25, and the olefin based synthetic resin is poured from the second extrusion molding machine 15 into the die 16 through a flow pipe 25. Then, the synthetic resins are polymerized and joined integrally in the die 16 by heat and pressure, by which the hollow tubular member 2 and the protective film layer 3 are extrusion molded integrally. The additive material 4 is not caused to fluidize by heat and pressure unlike the base material because of the difference in melting point, and is extruded while maintaining the original forms of grains and particles to some extent, so that the rough surface portion 5 with a large number of irregularities having a low frictional resistance is formed on the surface of the protective film layer 3. The extrusion molded protective tubular member 1 is pulled out through a cooling water tank 17 by a drawer 18, and is cut to a predetermined size by a cutter 19.

As a component used for the protective tubular member 1 of the present invention, the hollow tubular member 2 uses an olefin based resin. The protective film layers 3 and 6 use a synthetic resin such as olefin based resin, styrene based resin, urethane based resin, and nylon based resin as the base material, and grains and particles of a synthetic resin such as olefin based resin, styrene based resin, urethane based resin, silicon based resin, fluorine based resin, and nylon based as the additive material 4 having a higher melting point and lower frictional resistance than the base material.

In a modification of the protective tubular member 1 of the present invention, the internal protective film layer 3 and the external protective film layer 6 can be formed of a mixed synthetic resin consisting and an additive material. The base material is polyolefin based resin with a low frictional resistance having low viscosity and high fluidity. The additive material 4 comprises grains and particles of polyolefin based resin having a higher viscosity and lower fluidity than the base material, which is mixed with the base material. The internal protective film layer 3 can be provided with a rough surface portion 5 having a large number of irregularities on the exposed inner peripheral surface thereof, and the external protective film layer 6 can be provided with the rough surface portion 7 having a large number of irregularities on the exposed outer peripheral surface thereof.

A manufacturing process for the modified protective tubular member 1 in accordance with the present invention will be described with reference to FIG. 6. The first extrusion molding machine 14 contains, as component for forming the protective film layer 3, the mixed synthetic resin consisting of the base material of polyolefin based resin with a low frictional resistance, a low viscosity and high fluidity, and the additive material 4 of grains and particles of polyolefin based resin having a higher viscosity and lower fluidity than the base material. The second extrusion molding machine 15 contains an olefin based resin for forming the hollow tubular member 2. The first and second extrusion molding machines 14 and 15 are operated at the same time. Specifically, the mixed synthetic resin for the protective film layer is poured from the first extrusion molding machine 14 into a die 16 through a flow pipe 25, and the synthetic resin for the hollow tubular member is poured from the second extrusion molding machine 15 into the die 16 through a flow pipe 25. Then, the synthetic resins are polymerized and joined integrally in the die 16 by heat and pressure, by which the hollow tubular member 2 and the protective film layer 3 are extrusion molded integrally. The additive material 4 is not caused to fluidize by heat and pressure, unlike the base material because of the difference in melting viscosity and fluidity. And thus, the additive material 4 is extruded while maintaining the original forms of grains and particles to some extent, so that the rough surface portion 5 with a large number of irregularities having a low frictional resistance is formed on the surface of the protective film layer 3. The extrusion molded protective tubular member 1 is pulled out through a cooling water tank 17 by a drawer 18, and is cut to a predetermined size by a cutter 19.

As a component used for the modification of the protective tubular member 1 of the present invention, the hollow tubular member 2 uses an olefin based resin. The protective film layer 3 and 6 use polyethylene having a melt flow rate of over 0.5 g/10 minutes (ASTM D1238 190° C.) as a base material having low viscosity and high fluidity and grains and particles of polyethylene having a melt flow rate of less than 0.1 g/10 minutes (ASTM D1238 190° C.) as an additive material having high viscosity and low fluidity. The mixed synthetic resin with different melting viscosities for forming the protective film layers 3 and 6 is mixed in such a manner that the content of base material is 60 to 95% and that of additive material is 5 to 40%.

The protective tubular member for an automotive control wire in accordance with the present invention is formed with the protective film layer with the rough surface portion having a large number of irregularities at the inner periphery thereof. Therefore, the wear of the contact surface between the inner periphery of protective tubular member and the control wire can be reduced, which enables smooth operation of the control wire, and prevents damage to the protective tubular member caused by the wear.

What is claimed is:

1. A protective tubular member for an automotive control wire, said protective tubular member comprising:

a hollow tubular member formed of a synthetic resin; and a protective film layer connected integrally to said hollow tubular member, said protective film layer including a base material mixed with an additive material, wherein said base material is comprised of a polyolefin based resin having low frictional resistance, low viscosity and high fluidity, and wherein said additive material is comprised of grains and particles of polyolefin based resin having a higher viscosity and a lower fluidity than said base material so that said protective film layer is provided with a rough surface portion with irregularities on an exposed surface thereof.

2. A protective tubular member as claimed in claim 1, wherein said protective film layer is connected integrally to an inner peripheral surface of said hollow tubular member.

3. A protective tubular member as claimed in claim 2, further comprising a second protective film layer connected integrally to an outer peripheral surface of said hollow tubular member.

4. A protective tubular member for an automotive control wire, said protective tubular member comprising:

a hollow tubular member made of a synthetic resin;

a first protective film layer connected integrally to an inner peripheral surface of said hollow tubular member; and a second protective film layer connected integrally to an outer peripheral surface of said hollow tubular member, each of said first and second protective film layers being formed of a mixture comprising a base material and an additive material, wherein said base material is compatible with the synthetic resin of said hollow tubular member and has a lower frictional resistance than the synthetic resin of said hollow tubular member, and wherein said additive material comprises grains and particles of synthetic resin having a higher melting point and a lower frictional resistance than that of said base material so that each of said protective film layers is provided with a rough surface portion with irregularities on an exposed surface thereof.

* * * * *